United States Patent
Gemski et al.

(10) Patent No.: US 10,609,604 B2
(45) Date of Patent: Mar. 31, 2020

(54) HANDOVER FROM WIFI TO MOBILE NETWORK

(71) Applicant: Telefonaktiebolaget LM Ericsson (publ), Stockholm (SE)

(72) Inventors: Sven Gemski, Solna (SE); Matthias Nolle, Heerlen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/768,063

(22) PCT Filed: Oct. 12, 2016

(86) PCT No.: PCT/EP2016/074440
§ 371 (c)(1),
(2) Date: Apr. 13, 2018

(87) PCT Pub. No.: WO2017/064110
PCT Pub. Date: Apr. 20, 2017

(65) Prior Publication Data
US 2018/0324647 A1 Nov. 8, 2018

Related U.S. Application Data

(60) Provisional application No. 62/242,491, filed on Oct. 16, 2015.

(51) Int. Cl.
*H04W 4/00* (2018.01)
*H04W 36/00* (2009.01)
(Continued)

(52) U.S. Cl.
CPC ....... *H04W 36/0022* (2013.01); *H04W 36/14* (2013.01); *H04W 84/042* (2013.01); *H04W 84/12* (2013.01)

(58) Field of Classification Search
CPC .. H04W 36/0022; H04W 36/14; H04W 84/12
See application file for complete search history.

(56) References Cited

U.S. PATENT DOCUMENTS

| | | | |
|---|---|---|---|
| 9,532,276 B1* | 12/2016 | Malhotra | H04W 36/0022 |
| 2015/0117406 A1* | 4/2015 | Kim | H04W 36/0022 370/331 |
| 2015/0131619 A1* | 5/2015 | Zhu | H04W 36/0022 370/332 |

FOREIGN PATENT DOCUMENTS

| | | |
|---|---|---|
| GB | 2 482 806 A | 2/2012 |
| WO | WO 2015/081477 A1 | 6/2015 |
| WO | WO 2015/133955 A1 | 9/2015 |

OTHER PUBLICATIONS

International Search Report and Written Opinion of the International Searching Authority for International Application No. PCT/EP2016/074440 dated Feb. 10, 2017, 24 pages.

(Continued)

*Primary Examiner* — Abdelnabi O Musa
(74) *Attorney, Agent, or Firm* — Sage Patent Group

(57) ABSTRACT

The invention relates to a method for handling a handover of a call at a mobile entity from a WiFi network to a mobile communications network, comprising the following steps. A connection request is transmitted to a radio access network of the mobile communications network, the connection request comprising a first indicator indicating that the connection request is for a handover of an ongoing call currently handled by the WiFi network. A service request is transmitted to set up a connection to a call control node of the mobile communications network, the service request comprising a second indicator indicating that the service request is for the ongoing call currently handled by the WiFi network.

13 Claims, 6 Drawing Sheets

(51) Int. Cl.
*H04W 36/14* (2009.01)
*H04W 84/12* (2009.01)
*H04W 84/04* (2009.01)

(56) References Cited

OTHER PUBLICATIONS

International Preliminary Report on Patentability for International Application No. PCT/EP2016/074440 dated Dec. 21, 2017, 23 pages.
Qualcomm Incorporated et al., SA WG2 Meeting #99, Change Request, "Resuming PS services that have been handed over to non-3GPP," S2-133701, revision of S2-133451, Xiamen, P.R. China, 11 pages (Sep. 23-27, 2013).
Ericsson et al., 3GPP TSG SA WG2 Meeting #84, "Priority Mapping for eMPS SRVCC," TD S2-111676 Bratislava, Slovakia, 8 pages (Apr. 11-15, 2011).
Nortel Networks, TSG-SA WG1 #18, Change Request, "Coexistence of Priority Service and eMLPP in the same network," S1-022284, Busan, Korea, 12 pages (Nov. 11-15, 2002).
Ericsson, 3GPP TSG-CT WG1 Meeting #98, Change Request, "DRVCC from WiFi to CS," TD C1-162746, Osaka Japan, 7 pages (May 23-27, 2016).
Written Opinion of the International Preliminary Examining Authority for International Application No. PCT/EP2016/074440 dated Sep. 5, 2017, 14 pages.
3GPP TR 23.826 V9.0.0, 3rd Generation Partnership Project; Technical Specification Group Services and System Aspects; Feasibility Study on Voice Call Continuity Support for Emergency Calls (Release 9), Mar. 2009, 82 pages.

\* cited by examiner

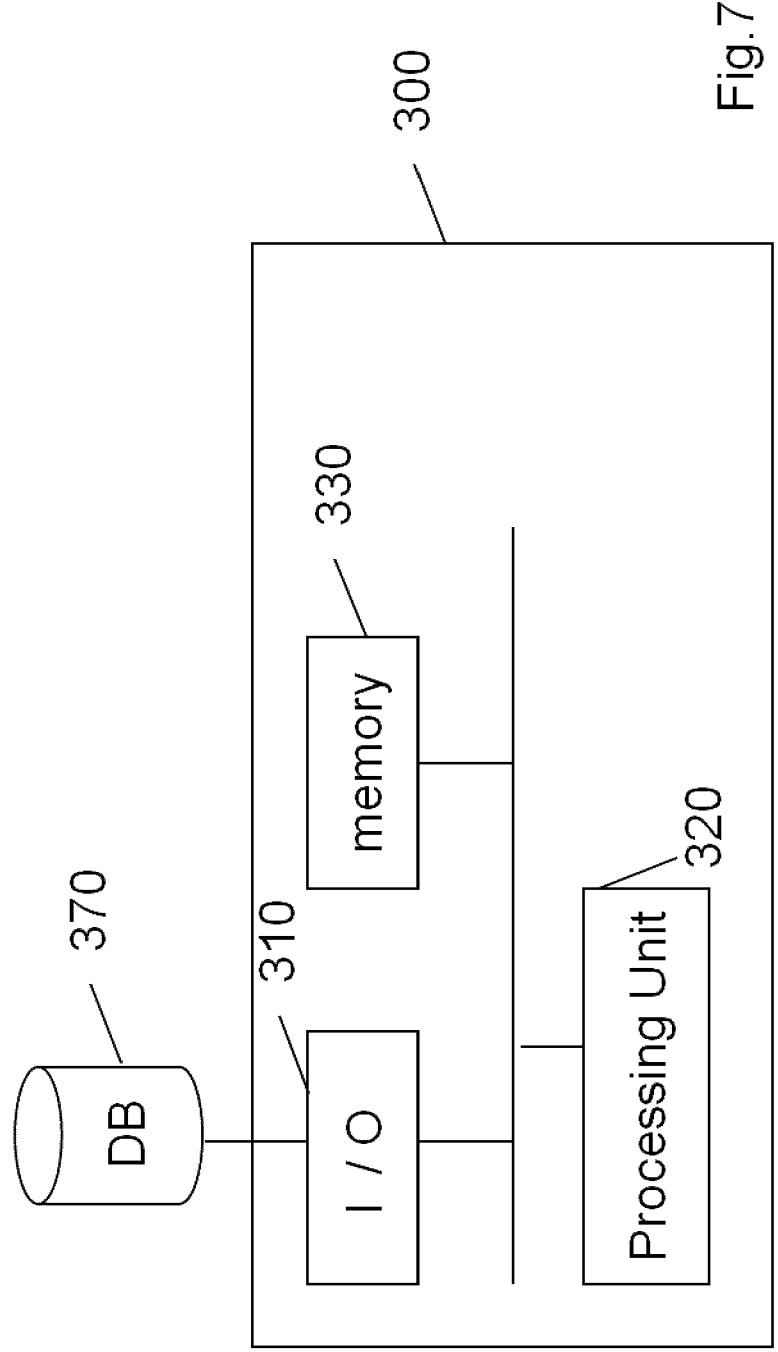

HANDOVER FROM WIFI TO MOBILE NETWORK

CROSS REFERENCE TO RELATED APPLICATIONS

This application is a 35 U.S.C. § 371 national stage application of PCT International Application No. PCT/EP2016/074440, filed on Oct. 12, 2016, which itself claims priority to U.S. Provisional Application No. 62/242,491 filed Oct. 16, 2015, the disclosure and content of both of which are incorporated herein by reference in their entireties.

TECHNICAL FIELD

The present invention relates to a method for handling a handover of a call of a mobile entity from a WiFi network to a mobile communications network and to the corresponding mobile entity. Furthermore, a method for operating a call control node and the corresponding call control node is provided. Additionally, the invention relates to a method for operating a node configured to allocate radio resources and to the corresponding node. Furthermore, a computer program and a carrier is provided.

BACKGROUND

Handovers (2G) and relocations (3G) in classic CS (Circuit Switched) mobile networks are ongoing calls that are moved between cells/service areas, BSC/RNCs (Base Station Controller/Radio Network Controller) and MSCs (Mobile Switching Center) if the concerned cells/service areas are served by two different BSC/RNCs and MSCs.

Handovers/relocations within classic CS mobile networks are always prioritized over normal calls (non-handover calls) in order to optimize the end user perception of the mobile service. This principle is based on the general opinion that it is more annoying for the end user to drop an ongoing call than having to redial when making a new call.

Prioritization of handovers/relocations over normal calls is performed by the target radio network (BSC/RNC) based on the type of request from the core network (MSC) or the UE (User Entity, also named Mobile Entity hereinafter). More specifically this means that the BSC/RNC always prioritizes radio resources for a Handover/Relocation Request message over a CM (Connection Management) Service Request message (a new MO (Mobile Originating) call), or a Paging Request message (a new MT (Mobile Terminating) call).

The prioritization of Handover/Relocation Request message over a CM Service Request message mechanism is needed in the BSC/RNC when there is high load or congestion in the target cell. The prioritization is also needed for minimizing the risk for dropped calls for fast moving UEs or generally for cases with sudden loss of coverage.

Handovers/relocations may also be new calls that are in the alerting state (ringing phase) or pre-alerting state (connecting phase) and considered as new calls from the end user point of view. However, for simplicity this application treats all handover/relocation call states (established, alerting and pre-alerting) equally.

Dual Radio Voice Call Continuity (DRVCC) is a concept for handover between different types of radio access networks, particularly between the non-3GPP WiFi access and the 3GPP based 2G and 3G radio accesses. A Dual Radio UE has both the 3GPP radio and the non-3GPP WiFi radio running active in parallel and can therefore easily transfer the call from the one access to the other. DRVCC does not require complex handover procedures in the network such as handling measurement reports, preparing target access and ordering the handover. The main complexity related to the DRVCC handover, including the decision to make a handover, is instead handled by the UE. When a DRVCC UE is about to lose WiFi coverage during a conversation it makes a new call in the 3GPP access by using standard call procedures for a mobile originating call. The conversation continues in the 3GPP access.

Enhanced Multi-Level Precedence and Pre-emption (eMLPP) is a concept for allocating priority to certain calls in the network based on either the subscription (e.g. gold/silver/bronze subscription etc.) or call type (e.g. emergency call). The priority is mainly aimed for the radio access network but it can also be used in the core network. If priority has been allocated to the originating subscriber of the call, this priority is also applied for the terminating subscriber.

The eMLPP priority information consists of a BSSMAP/RANAP priority level, a pre-emption vulnerability indicator, a pre-emption capability indicator and a queuing allowed indicator.

Ongoing WiFi calls will not be prioritized over new CS calls when moving into CS during DRVCC handover which means that operators' call drop call rate will be higher for WiFi calls than for classic CS calls. This is because the initial intention with the DRVCC handover mechanism in the standardization was to simplify the introduction of the handover by making it transparent to the receiving CS network. Instead of introducing complex handover procedures between the WiFi and CS network domain the DRVCC handover is reusing legacy call setup procedures when setting up the new handover call leg towards the CS network. This simplification unfortunately means that neither the MSC nor the 2G/3G RAN know if a new call request is for a new call or for a DRVCC handover of an already ongoing WiFi call.

SUMMARY

Accordingly, a need exists to reduce the call drop rate in a handover procedure when a call is handed over from a WiFi network to a mobile communications network.

This need is met by the features of the independent claims. Further aspects are described in the dependent claims.

According to a first aspect, a method for handling a handover of a call via a mobile entity from a WiFi network to a mobile communications network is provided, the method comprising the step of transmitting a connection request to a radio access network of the mobile communications network, wherein the connection request comprises a first indicator indicating that the connection request is for a handover of an ongoing call currently handled by the WiFi network. Furthermore, a service request is transmitted to set up a connection to a call control node of the mobile communications network, the service request comprising a second indicator indicating that the service request is for the ongoing call currently handled by the WiFi network.

Furthermore, a method for operating a call control node is provided wherein the call control node receives the service request from the mobile entity to set up a connection wherein the service request comprises the indicator indicating that the connection request is for an ongoing call currently handled by a WiFi network. The call control node can then prioritize the call handling of the ongoing call in the call control node with a higher priority level than a default priority level assigned for a mobile originating or mobile terminating call.

Furthermore, a corresponding call control node is provided including an interface for the reception of the message such as the service request including the indicator and at least one processing unit configured to prioritize the call handling as discussed above.

Furthermore, a method for operating a node configured to allocate radio resources in a radio access network of the mobile communications network is provided. The node receives a connection request from a mobile entity comprising an indicator indicating that the connection request is for a handover of an ongoing call currently handled by a WiFi network. The node then allocates radio resources to the mobile entity with a higher priority level then a default priority level allocated to a terminating or originating call.

Furthermore, the corresponding node is provided comprising an interface and a processing unit configured to work as mentioned above. Furthermore, a method for operating a call control node is provided wherein a setup message is received from a mobile entity, the setup message comprising a session transfer number. The call control node compares the session transfer number in the received setup message to other session transfer numbers stored in a database wherein, if the session transfer number contained in the setup message matches one of the number in the database, the call control node can prioritize the call handling of the call of the mobile entity in the call control node with a higher priority level than a default priority level assigned for a mobile originating or mobile terminating call.

Furthermore, the corresponding call control node is provided.

Furthermore, a computer program comprising program code and a carrier is provided.

BRIEF DESCRIPTION OF THE DRAWINGS

The invention will be described in further detail with reference to the accompanying drawings.

FIG. 7 shows a schematic architectural view of a call control node involved in a handover shown in the embodiments of FIGS. 1, to 4.

DETAILED DESCRIPTION OF EMBODIMENTS

Figure 1:
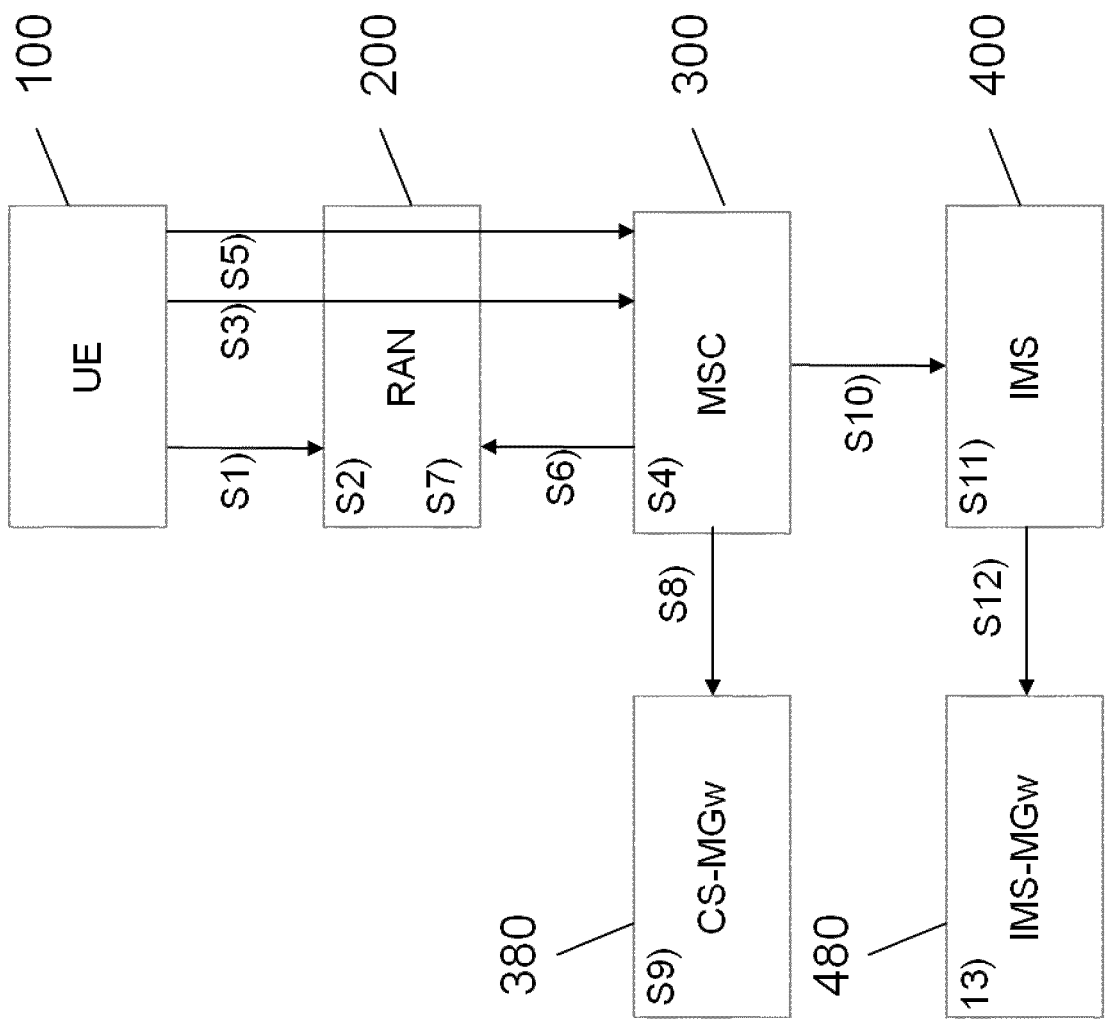
FIG. 1 shows a block diagram of the entities involved in a handover of an ongoing call from a WiFi network to a mobile communications network.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional bocks, devices, components or other physical or functional units shown in the drawings or described herein may also be implemented by an indirect connection or coupling. A coupling between components may be established over a wired or wireless connection. Functional blocks may be implemented in hardware, firmware, software or a combination thereof.

The term "WiFi" used in this document may specifically refer to networks as specified in the IEEE 802.11 standard series. However it is apparent that the procedures described herein can also be applied to handovers of calls originating from other types of networks, particularly non-3GPP networks.

According to a first aspect, a method for handling a handover of a call via a mobile entity from a WiFi network to a mobile communications network is provided, the method comprising the step of transmitting a connection request to a radio access network of the mobile communications network, wherein the connection request comprises a first indicator indicating that the connection request is for a handover of an ongoing call currently handled by the WiFi network. Furthermore, a service request is transmitted to set up a connection to a call control node of the mobile communications network, the service request comprising a second indicator indicating that the service request is for the ongoing call currently handled by the WiFi network.

Furthermore, the corresponding mobile entity operating as mentioned above is provided comprising an interface for the transmission of the connection and the service request.

When the mobile entity informs the radio access network and the call control node about the fact that the transmitted messages do not relate to a common call setup, but to an ongoing call, the radio access network and the call control node can react accordingly and handle requests of said mobile entity relating to the call with priority compared to a default handling of mobile originating or mobile terminating calls. For the connection request to the radio access network the indicator is named first indicator, whereas the indicator contained in the service request is named second indicator. As the messages in which the corresponding indicators are transmitted may have different formats, the two indicators are named differently. However, it should be understood that the information contained in the first indicator and in the second indicator may be the same, but may be implemented in different protocol structures.

Furthermore, a method for operating a call control node is provided wherein the call control node receives the service request from the mobile entity to set up a connection wherein the service request comprises the indicator indicating that the connection request is for an ongoing call currently handled by a WiFi network. The call control node can then prioritize the call handling of the ongoing call in the call control node with a higher priority level than a default priority level assigned for a mobile originating or mobile terminating call.

Furthermore, a corresponding call control node is provided including an interface for the reception of the message such as the service request including the indicator and at least one processing unit configured to prioritize the call handling as discussed above.

Furthermore, a method for operating a node configured to allocate radio resources in a radio access network of the mobile communications network is provided. The node receives a connection request from a mobile entity comprising an indicator indicating that the connection request is for a handover of an ongoing call currently handled by a WiFi network. The node then allocates radio resources to the mobile entity with a higher priority level then a default priority level allocated to a terminating or originating call.

Furthermore, the corresponding node is provided comprising an interface and a processing unit configured to work as mentioned above. Furthermore, a method for operating a call control node is provided wherein a setup message is received from a mobile entity, the setup message comprising a session transfer number. The call control node compares the session transfer number in the received setup message to other session transfer numbers stored in a database wherein, if the session transfer number contained in the setup message matches one of the number in the database, the call control node can prioritize the call handling of the call of the mobile entity in the call control node with a higher priority level than a default priority level assigned for a mobile originating or mobile terminating call.

Furthermore, the corresponding call control node is provided.

Furthermore, a computer program comprising program code and a carrier is provided.

The invention comprises two different solutions which both introduce a similar priority handling for DRVCC handover from WiFi to CS as is implemented today for handover/relocation within the CS network. Of course, the proposed solution may not only be applied for handover to a CS (circuit switched) network, but also to a PS (packet switched) network.

The first solution is based on new DRVCC indicators from the UE towards the RAN and a call control node, e.g. an MSC (Mobile Switching Centre). The DRVCC indicators are used to associate a radio resource request (to RAN) and a mobile originating call request (to call control node) with a DRVCC handover so that priority handing can be applied by both the RAN and the MSC. The call control node also uses the DRVCC indication for triggering priority handling for the DRVCC handover within the call control node, in other CN nodes and in the IMS by reusing standardized priority mechanisms.

The second solution introduces a database with session transfer numbers (STN) that are used by a call control node (e.g. the MSC) for associating a mobile originating call setup message from the UE with a DRVCC handover. Each mobile originating call setup message from the UE to the call control node includes a called party number which represents either 1) the B-number of the dialed subscriber or 2) a session transfer number (STN) for routing a DRVCC handover call to a destination in IMS. The call control node compares the called party number in the setup message with the numbers stored in the STN database in order to conclude if a call is a normal MO call or a DRVCC handover. When a DRVCC handover is identified by the call control node it triggers priority handling for the DRVCC handover within the call control node, in the RAN, in other CN nodes and in the IMS by reusing standardized priority mechanisms.

The advantages of the proposed solutions are reduced call drop rate and increased DRVCC handover success rate for WiFi calling users since ongoing calls are prioritized over new calls at DRVCC. This is particularly important in high load situations in the radio and/or core network and when UEs are moving fast out of the WiFi coverage. The solution is also important in case the internet access to the WiFi AP is suddenly lost or in case the WiFi AP automatically restarts etc.

Besides reducing the call drop rate the proposed solution also reduces the risk for that end users experience a silence moment in the speech conversation since the DRVCC procedure can be completed faster e2e.

The improved key performance indicators for call drop rate, handover success rate, and to some extent also the silent period during DRVCC, improves the perception of the operator as a service provider. This means a reduced churn rate which in its turn also means increased or maintained revenues and reduced subscriber acquisition costs.

Figure 2:
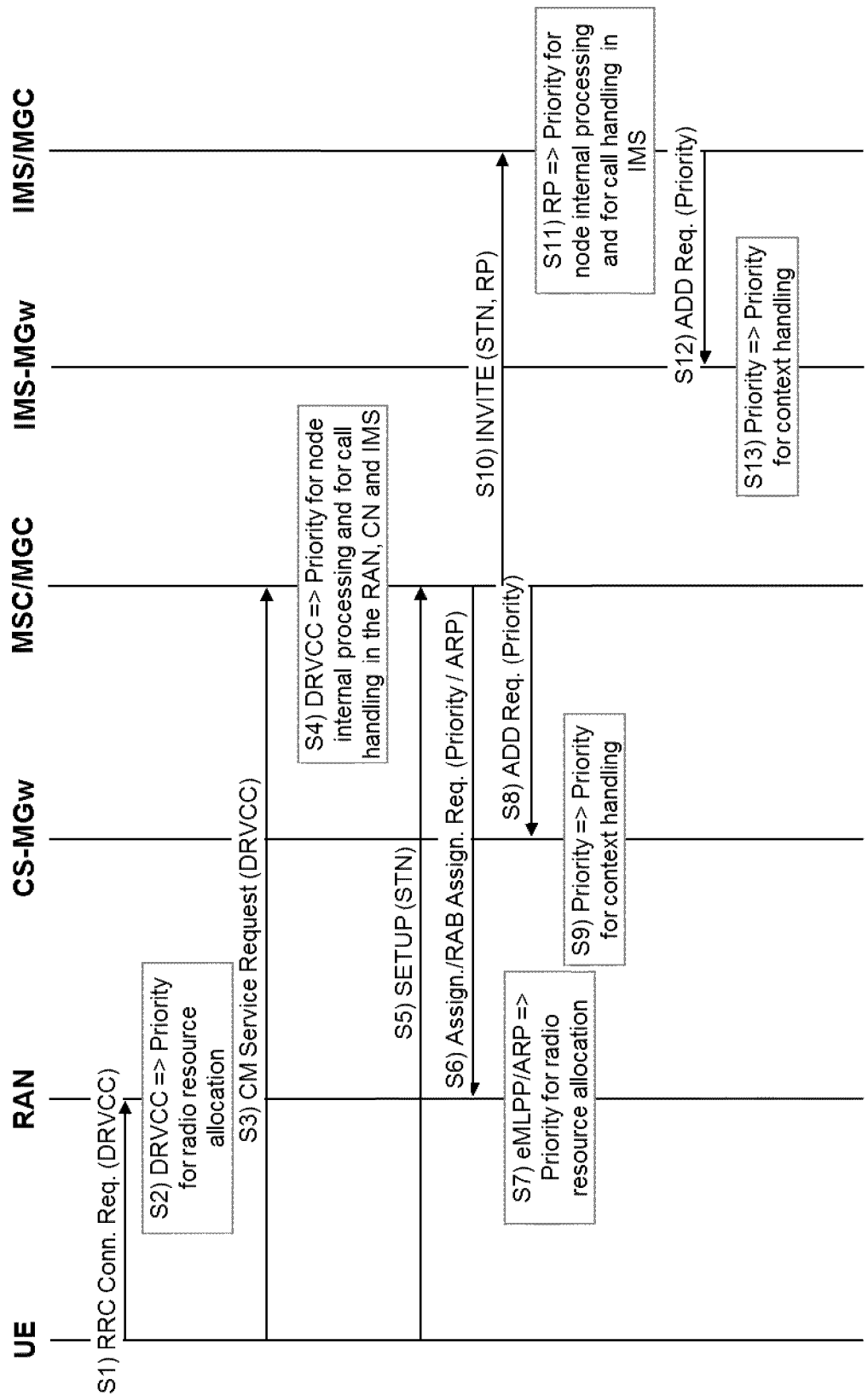
FIG. 2 shows a call flow diagram for the situation shown in FIG. 1.

FIGS. 1 and 2 show a first embodiment in which the mobile entities, such as the mobile entity 100 shown in the figures, indicate to the mobile network the transmitted messages relate to an ongoing call that was previously handled by a WiFi network (not shown in the figures), wherein a RAN (Radio Access Network) node 200 is specified as RAN 200 in short.

In the following, an MSC is used as an example of a call control node of a circuit switched call. However, any other node configured to control a circuit or packet switched call may be used.

Solution 1—DRVCC indicators over RRC, RANAP (Radio Access Network Application Party) and BSSAP (Base Station Subsystem Application Part)

S1) The UE 100 sends a DRVCC indicator to the RAN 200.

S2) The RAN 200 applies priority for the DRVCC handover.

S3) The UE 100 sends a DRVCC indicator to the MSC 300 via the RAN 200.

S4) The MSC 300 applies priority for the DRVCC handover.

S5) The UE 100 sends an STN to the MSC 300 via the RAN 200.

S6) The MSC 300 sends priority information to the RAN 200.

S7) The RAN 200 applies priority for the DRVCC handover based on information from the MSC (if not supporting DRVCC indicator).

S8) The MSC 300 sends priority information to the CS-MGw (Media Gateway) 380.

S9) The CS-MGw 380 applies priority for the DRVCC handover.

S10) The MSC sends priority information to the IMS 400.

S11) The IMS (IP Multimedia Subsystem) node(s) 400 applies priority for the DRVCC handover.

S12) The IMS provides priority information to the IMS-MGw 480.

S13) The IMS-MGw 480 applies priority for the DRVCC handover.

A more detailed view of the procedure of FIG. 1 is explained in connection with FIG. 2.

S1) The UE sends an RRC Connection Request to the RAN with a new establishment cause for DRVCC handover.

S2) The RAN prioritizes radio resource allocation for the DRVCC handover based on the DRVCC establishment cause.

S3) The UE sends a CM Service Request to the MSC with a new DRVCC indicator in order to initiate a mobile originating call and for informing the MSC that the call is a DRVCC handover.

S4) The MSC gives priority to the DRVCC handover for node internal processing and for call handling within the MSC, towards other CNCS nodes and towards the IMS, based on the DRVCC indicator. Priority may be provided based on the eMLPP service. The priority level given to DRVCC calls is higher than the default priority level given to normal calls. By using the eMLPP service the MSC can also provide the pre-emption capability indicator, pre-emption vulnerability indicator and the queuing allowed indicator. By way of example, the priority level can be a value between 1 and 14, with 1 being the highest priority and 14 being the lowest priority. The priority level and the preemption indicators may be used to determine whether the request has to be performed unconditionally and immediately. By way of example, 14 may be a default priority. The pre-emption capability is an indicator that indicates the pre-emption capability of the request on other radio access bearers (RAB). The pre-emption vulnerability indicates the vulnerability of the RAB to pre-emption of other RABs, e.g. the RAB shall not be pre-empted by other RAB or the RAB may be pre-empted by other RABs. The queuing allowed indicator indicates whether the request can be placed into a resource allocation queue or not.

S5) The UE sends a SETUP message to the MSC with a session transfer number (STN) in the called party address (CdPA) field so that the MSC can route the DRVCC handover to the correct node in the IMS network.

S6) The MSC informs the RAN about the priority for the DRVCC call by populating the priority attributes in the Assignment Request (GSM) and RAB Assignment Request (WCDMA) with a priority level higher than the priority used for an ordinary mobile originating or mobile terminating call.

S7) RAN nodes that do not support the new DRVCC establishment cause from the UE in step 1 may use the priority information from the MSC to prioritize radio resource allocation for the DRVCC handover (legacy functionality).

S8) The MSC informs the MGw about the priority for context (call) handling through the priority parameter in the ADD Request.

S9) The MGw prioritizes the context handling for the DRVCC call based on the priority information received from the MSC.

S10) The MSC informs the IMS about the priority for the DRVCC call through the Resource Priority header in the SIP INVITE message.

S11) The IMS gives priority to the DRVCC call for node internal processing and for call handling.

S12) The IMS informs the IMS-MGw about the priority for context (call) handling through the priority parameter in the ADD Request.

S13) The IMS-MGw prioritizes the context handling for the DRVCC call.

Figure 3:
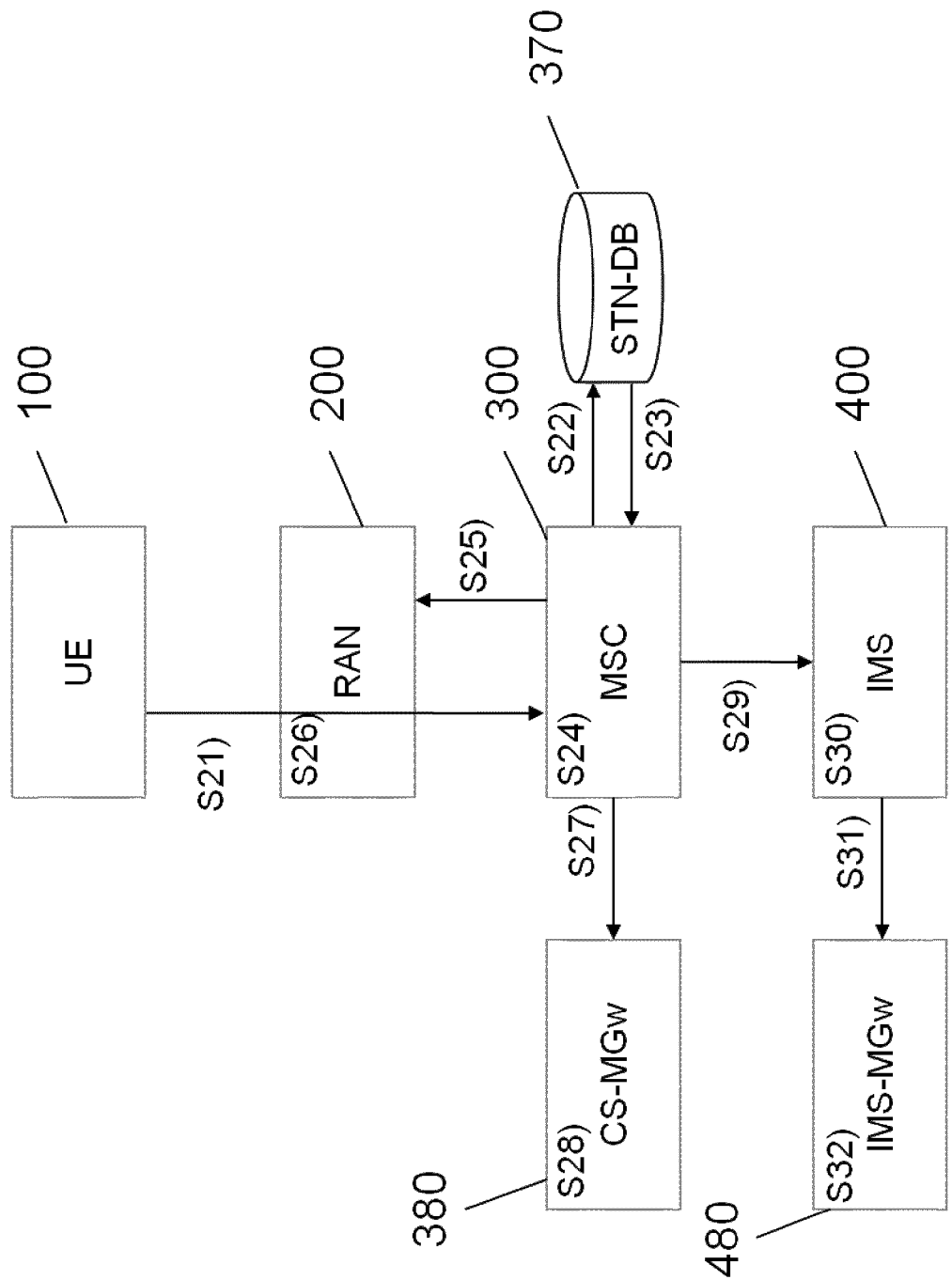
FIG. 3 shows a block diagram of a further solution for handing over a call from a WiFi network to a mobile communications network.
Figure 4:
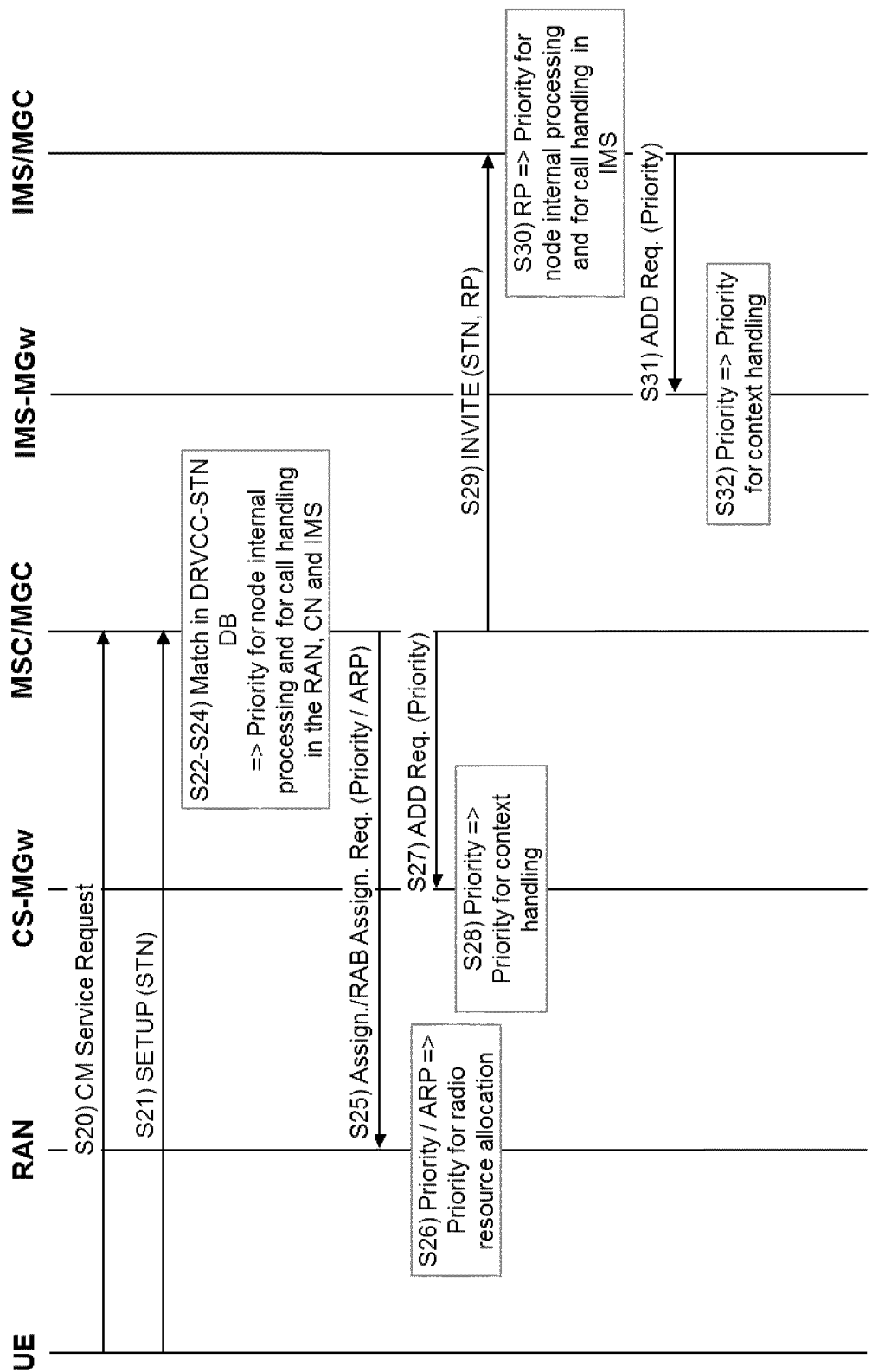
FIG. 4 is a call flow diagram of the situation shown in FIG. 3.

In connection with FIGS. 3 and 4 another solution is discussed in which the UE 100 does not actively inform the mobile communications network of the ongoing call, but the call control node, such as the MSC 300, determines whether the received request relates to an ongoing call that was previously handled by a WiFi network.

S21) The UE 100 sends the STN parameter to the MSC 300 via the RAN 200.

S22) The MSC 300 sends the received STN in a query to the STN-DB 370, is there a matching STN in the STN-DB?

S23) The STN-DB 370 responds with a positive result (matching STN) to the MSC 300.

S24) The MSC 300 applies priority for the DRVCC handover.

S25) The MSC 300 provides priority information to the RAN 200.

S26) The RAN 200 applies priority for the DRVCC handover.

S27) The MSC 300 provides priority information to the CS-MGw 380.

S28) The CS-MGw 380 applies priority for the DRVCC handover.

S29) The MSC 300 provides priority information to the IMS 400.

S30) The IMS 400 applies priority for the DRVCC handover.

S31) The IMS 400 provides priority information to the IMS-MGw 480.

S32) The IMS-MGw 480 applies priority for the DRVCC handover.

FIG. 4 shows a more detailed view of the embodiment of FIG. 3.

S20) The UE sends a CM Service Request to the MSC in order to initiate a mobile originating call.

S21) The UE sends a SETUP message to the MSC with a session transfer number (STN) in the called party address (CdPA) field so that the MSC can route the mobile originating call to the correct node in the IMS network.

S22 and S23) The MSC compares the STN received in the SETUP message with the numbers stored in the internal or external DRVCC-STN database and concludes that the requested mobile originated call is a DRVCC handover. In step S24), the MSC gives priority to the DRVCC handover for node internal processing and for call handling within the MSC, towards the RAN, towards other CN nodes and towards IMS based on a match between the received STN from the SETUP message and an STN in the DRVCC-STN database. Priority may be provided based on the eMLPP service. The priority level given to DRVCC handovers is higher than the default priority level given to normal calls. By using the eMLPP service the MSC can also provide the pre-emption capability indicator, pre-emption vulnerability indicator and the queuing allowed indicator as discussed in connection with FIG. 2.

S25) The MSC informs the RAN about the priority for the DRVCC call by populating the priority attributes in the Assignment Request (GSM) and RAB Assignment Request (WCDMA) with a priority level higher than the priority used for an ordinary mobile originating or mobile terminating call.

S26) The RAN prioritizes traffic channel assignment (GSM) and RAB assignment (WCDMA) in the cell/service area based on the received priority information, as a result the DRVCC call is handled before normal CS calls.

S27) The MSC informs the MGw about the priority for context (call) handling through the priority parameter in the ADD Request.

S28) The MGw prioritizes the context handling for the DRVCC call based on the priority information received from the MSC.

S29) The MSC informs the IMS about the priority for the DRVCC call through the Resource Priority header in the SIP INVITE message.

S30) The IMS gives priority to the DRVCC call for node internal processing and for call handling.

S31) The IMS informs the IMS-MGw about the priority for context (call) handling through the priority parameter in the ADD Request.

S32) The IMS-MGw prioritizes the context handling for the DRVCC call.

Figure 5:
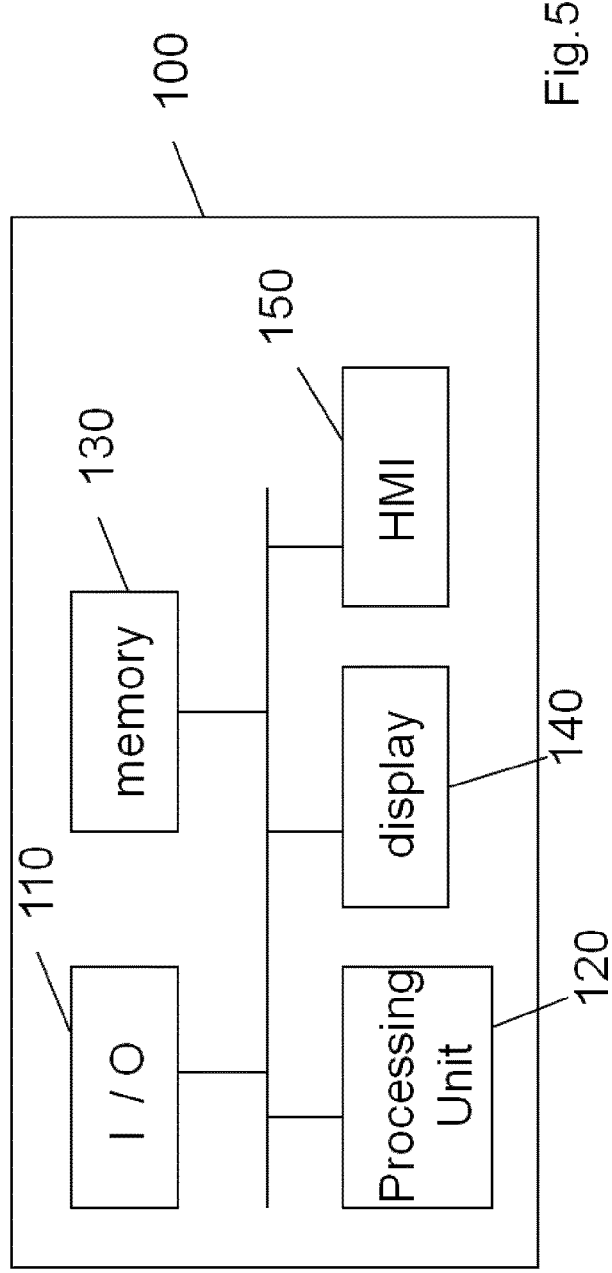
FIG. 5 is a schematic architectural view of a mobile entity involved in the operation of FIGS. 1 to 4.

FIG. 5 shows a schematic architectural view of a mobile entity involved in the methods discussed above. The mobile entity comprises an interface 110 for transmitting control messages or user data and for receiving control messages and user data. By way of example, the interface 110 may be used to transmit the messages described above in connection with FIGS. 1 to 4 or to receive the corresponding messages. The mobile entity furthermore comprises one or more processing units 120 and a memory 130. The memory 130 may include a read-only memory, e.g. a flash ROM, a random access memory, e.g. a dynamic RAM, a mass storage or the like. The memory 130 includes a suitably configured program code to be executed by the processing unit 120 so as to implement the above described functionalities of the mobile entity. Furthermore, the mobile entity can comprise a display 140 and a human machine interface 150 for the interaction with a user.

Figure 6:
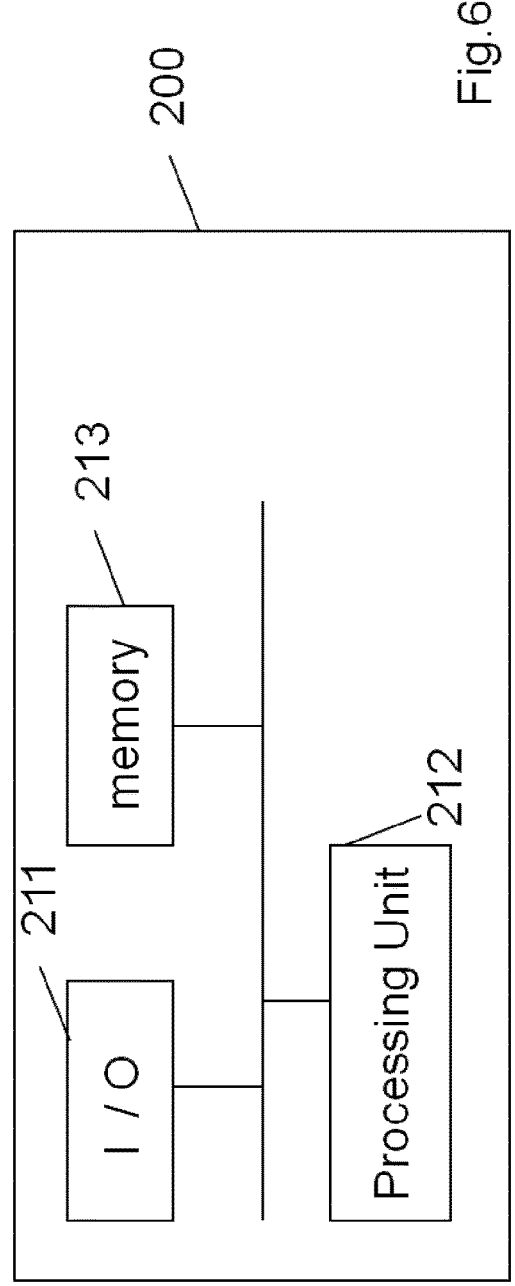
FIG. 6 shows a schematic architectural view of a node of a radio access network involved in the call handover of FIGS. 1 to 4.

FIG. 6 shows a schematic view of a node of a radio access network including an interface 211 for the transmission and reception of user data or control messages to other entities or from other entities. A processing unit 212 is provided which is responsible for the operation of the node 200 in the radio access network. A memory 213 can include a suitably configured program code to be executed by the processing unit 212.

FIG. 7 shows a call control node, such as an MSC 300, comprising an input/output unit 310 which in the embodiment shown is connected to a database 370, where the different STN numbers are stored. The database may be part of the MSC 300, however, the database may also be located separated from the MSC. The MSC 300 is aware of the STN as, when the mobile entity starts a voice call over the WiFi network, an STN number is provided by the IMS. This STN number is network or mobile entity specific and, when the mobile entity starts a call via the WiFi network, the IMS provides the STN number which may then be collected in the database 370 by the MSC 300 for the purposes discussed above in connection with FIGS. 3 and 4. A processing unit 320 is provided which is responsible for the operation of the MSC as discussed above. A memory 330 comprises a suitably programmed program code in order to execute the functions of the MSC as mentioned above.

Summarizing, a mobile entity is provided comprising a processing unit 120 and a memory 130, said memory containing instructions executable by the processing unit 120, whereby the mobile entity is operative to carry out the steps shown in one of FIGS. 1 to 4. In the same way, a node of the radio access network is provided comprising a processing 212 and a memory 213, wherein the memory contains instructions executable by the processing unit 212, whereby the node is operative to carry out the steps in which the node 200 is involved as discussed above in connection with FIGS. 1 to 4.

Furthermore, a call control node comprising a processing unit 320 and a memory 330 is provided, wherein the memory 330 contains instructions executable by the processing unit 320, whereby the call control node is operative to carry out the steps in which the MSC is involved as discussed above in connection with FIGS. 1 to 4.

The invention claimed is:

1. A method performed by a mobile entity that operates to handle a Dual Radio Call Continuity (DRVCC) handover of a call at the mobile entity from a WiFi network to a 3GPP mobile communications network, the method comprising:
    transmitting a Radio Resource Control (RRC) connection request to a radio access network node of the 3GPP mobile communications network, the RRC connection request comprising a first DRVCC indicator indicating that the RRC connection request is for a handover of an ongoing call currently handled by the WiFi network,
    transmitting a Connection Management (CM) service request to set up a new connection to a call control node of the 3GPP mobile communications network, the CM service request comprising a second DRVCC indicator indicating that the CM service request to setup the new connection is for the ongoing call currently handled by the WiFi network,
    wherein the first DRVCC indicator also indicates that the RRC connection request is associated with a higher priority for radio resources of the radio access network node than other RRC connection requests requesting radio resources from the radio access network node; and
    wherein the second DRVCC indicator also indicates that the CM service request is associated with a higher priority for establishing a new connection with the call control node than other CM service requests requesting new connections with the call control node.

2. A computer program comprising a non-transitory computer readable medium storing program code to be executed by at least one processor of a mobile entity, wherein execution of the program code causes the at least one processor to execute a method according to claim 1.

3. A mobile entity that operates to handle a Dual Radio Call Continuity (DRVCC) handover of a call at the mobile entity from a WiFi network to a 3GPP mobile communications network, the mobile entity comprising:
    a processor and a memory comprising executable instructions that when executed by the processor causes the processor to operate to:
    transmit a Radio Resource Control (RRC) connection request to a radio access network node of the 3GPP mobile communications network, the RRC connection request comprising a first DRVCC indicator indicating that the RRC connection request is for a handover of an ongoing call currently handled by the WiFi network,
    transmit a Connection Management (CM) service request to set up a new connection to a call control node of the 3GPP mobile communications network, the CM service request comprising a second DRVCC indicator indicating that the CM service request to setup the new connection is for the ongoing call currently handled by the WiFi network,
    wherein the first DRVCC indicator also indicates that the RRC connection request is associated with a higher priority for radio resources of the radio access network node than other RRC connection requests requesting radio resources from the radio access network node; and
    wherein the second DRVCC indicator also indicates that the CM service request is associated with a higher priority for establishing a new connection with the call control node than other CM service requests requesting new connections with the call control node.

4. A method performed by a call control node of a 3GPP mobile communications network, the method comprising:
    receiving a Connection Management (CM) service request from a mobile entity to set up a new connection, the CM service request comprising a Dual Radio Call Continuity (DRVCC) indicator indicating that the CM service request to setup the new connection is for an ongoing call currently handled by a WiFi network,
    handling setup for the new connection for the ongoing call of the mobile entity in the call control node prior to handling other mobile originating or mobile terminating calls based on the DRVCC indicator indicating that the CM service request is associated with a higher priority for establishing a new connection with the call control node than other CM service requests requesting new connections with the call control node.

5. The method according to claim 4, further comprising: responsive to receiving the CM service request, informing an IP multimedia subsystem that the ongoing call for said mobile entity should be handled with a higher priority level than the default priority level used in the IP multimedia subsystem for other calls.

6. The method according to claim 4, further comprising: responsive to receiving the CM request, informing a radio access network node of the 3GPP mobile communications network that the call for said mobile entity should be handled with a higher priority level than a default priority level assigned for other mobile originating or mobile terminating calls.

7. The method according to claim 4, further comprising: responsive to receiving the CM service request, informing a media gateway that the call of said mobile entity should be handled with a higher priority level than a default priority level.

8. A computer program comprising a non-transitory computer readable medium storing program code to be executed by at least one processor of a call control node, wherein execution of the program code causes the at least one processor to execute a method according to claim 4.

9. A call control node of a 3GPP mobile communications network, the call control node comprising:
an interface that operates to receive a connection management (CM) service request from a mobile entity to set up a connection, the connection management service request comprising a Dual Radio Call Continuity (DRVCC) indicator indicating that the connection management service request is for an ongoing call currently handled by a WiFi network,
a processor and a memory comprising executable instructions that when executed by the processor causes the processor to operate handle setup for the new connection for the ongoing call of the mobile entity in the call control node prior to handling other mobile originating or mobile terminating calls based on the DRVCC indicator indicating that the CM service request is associated with a higher priority for establishing a new connection with the call control node than other CM service requests requesting new connections with the call control node.

10. The call control node according to claim 9, wherein the interface further operates to inform a radio access network of the mobile communications network that the call for said mobile entity should be handled with a higher priority level than a default priority level assigned for other mobile originating or mobile terminating calls in response to the reception of the CM service request.

11. The call control node according to claim 9, wherein the interface further operates to inform an IP multimedia subsystem that the ongoing call for said mobile entity should be handled with a higher priority level than a default priority level assigned to other calls in response to the reception of the CM service request.

12. The call control node according to claim 9, wherein the interface further operates to inform a radio access network of the mobile communications network that the call for said mobile entity should be handled with a higher priority level than a default priority level assigned for other mobile originating or mobile terminating calls in response to the reception of the CM service request.

13. The call control node according to claim 9, wherein the interface further operates to inform a media gateway that the ongoing call of said mobile entity should be handled with a higher priority level than a default priority level assigned to other calls in response to the reception of the CM service request.

* * * * *